(12) United States Patent
Shinto

(10) Patent No.: US 8,958,101 B2
(45) Date of Patent: Feb. 17, 2015

(54) IMAGE PROCESSING APPARATUS, METHOD OF CONTROLLING THE SAME, AND STORAGE MEDIUM

(71) Applicant: Canon Kabushiki Kaisha, Tokyo (JP)

(72) Inventor: Yasushi Shinto, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 13/897,648

(22) Filed: May 20, 2013

(65) Prior Publication Data

US 2013/0329248 A1    Dec. 12, 2013

(30) Foreign Application Priority Data

Jun. 11, 2012   (JP) ................. 2012-132367

(51) Int. Cl.
*G06F 3/12* (2006.01)
*G06F 15/00* (2006.01)
*H04N 1/387* (2006.01)
*H04N 1/46* (2006.01)
*G06F 17/24* (2006.01)
*H04N 1/00* (2006.01)
*H04N 1/38* (2006.01)

(52) U.S. Cl.
CPC ......... *H04N 1/00442* (2013.01); *H04N 1/0044* (2013.01); *H04N 1/00448* (2013.01); *H04N 1/00472* (2013.01); *H04N 1/0048* (2013.01); *H04N 1/38* (2013.01); *H04N 1/00482* (2013.01)
USPC ........... 358/1.15; 358/1.9; 358/452; 358/537; 715/255; 715/274

(58) Field of Classification Search
CPC ..... G06F 3/1208; G06F 3/1256; G06F 17/25; G06F 17/26
See application file for complete search history.

(56) References Cited

U.S. PATENT DOCUMENTS

2012/0105891 A1 *   5/2012   Mano et al. ................. 358/1.13

FOREIGN PATENT DOCUMENTS

JP        2006-186946 A        7/2006

* cited by examiner

*Primary Examiner* — Thomas Lett
(74) *Attorney, Agent, or Firm* — Carter, DeLuca, Farrell & Schmidt, LLP

(57) ABSTRACT

An image processing apparatus and a method of controlling the same according to the present invention, displays a preview image by inputting image data read in a two-page spread mode in which two facing pages of a document are read and divided into two pages, and when a first area of one of the divided pages in the two-page spread mode is specified on the displayed preview image, the first area specified is reflected on a second area to be specified of the divided other page. Image data of the first and the second area is extracted from the image data read in the two-page spread mode.

10 Claims, 17 Drawing Sheets

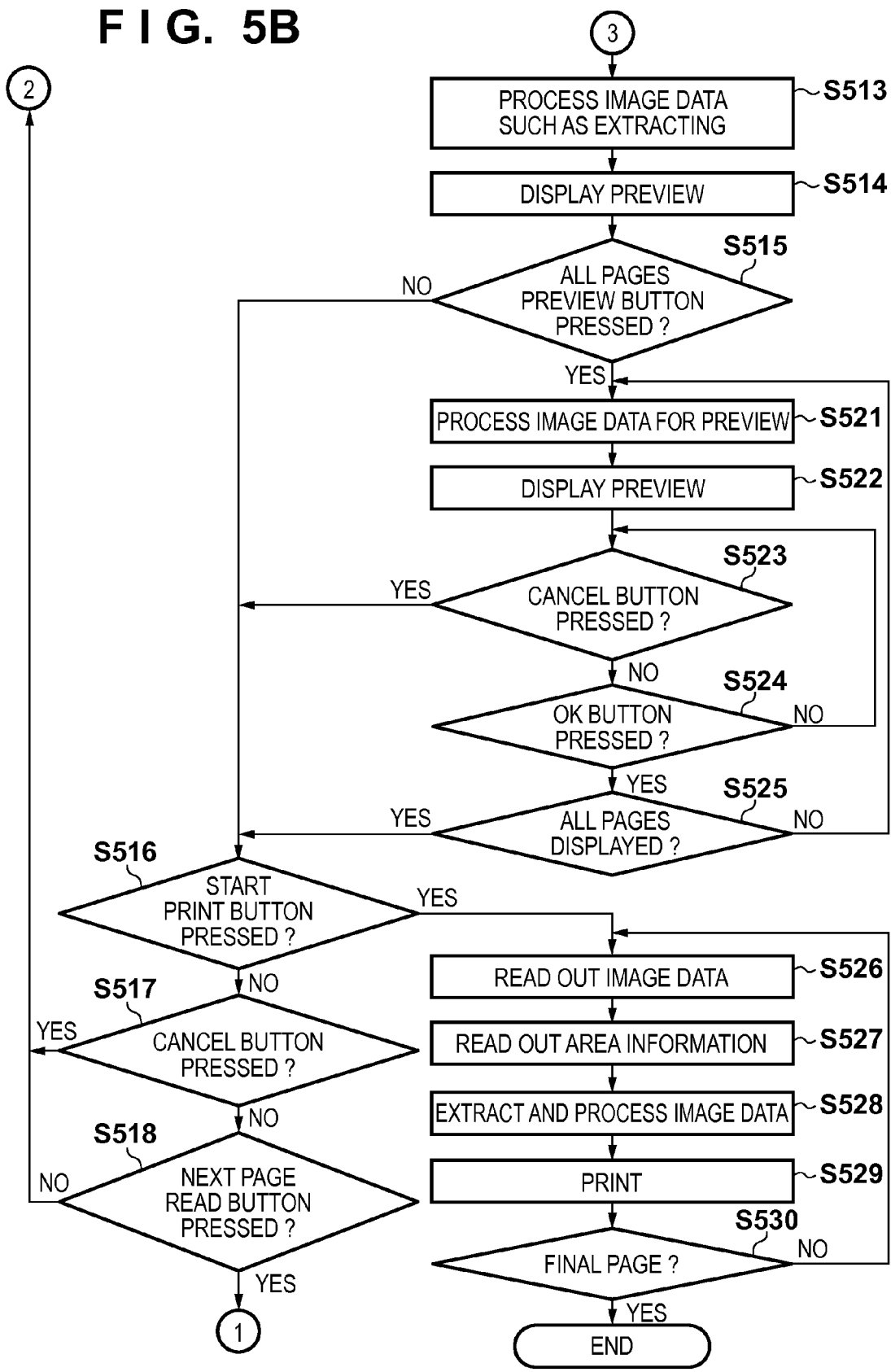

FIG. 9A

| A B C<br>A B C | 1 2 3<br>1 2 3<br>1 2 3 |
|---|---|

FIG. 9B

| D E F<br>D E F | 4 5 6<br>4 5 6<br>4 5 6 |
|---|---|

FIG. 9C

| a b c<br>a b c | 1 2 3<br>4 5 6<br>7 8 9 |
|---|---|

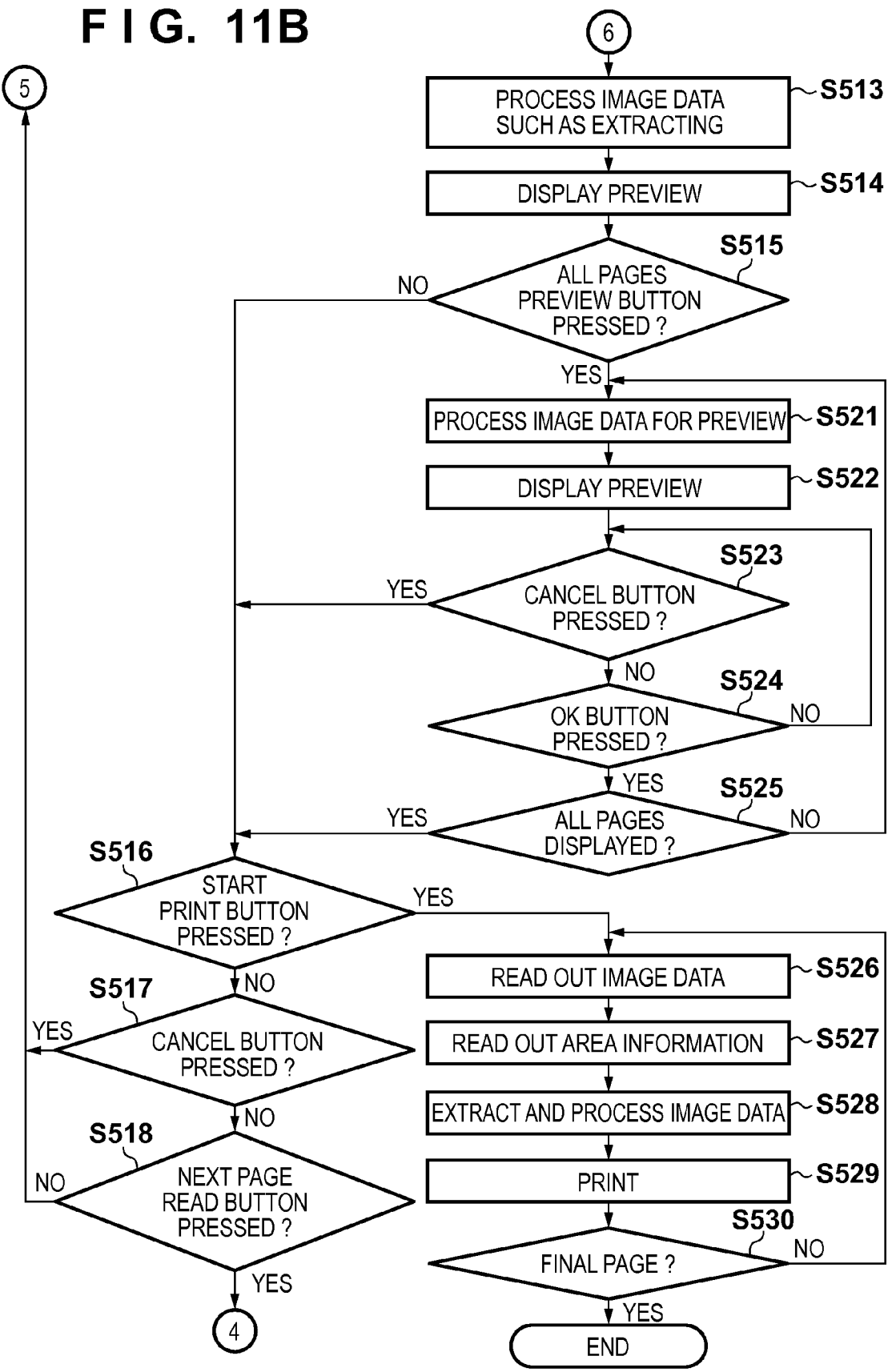

IMAGE PROCESSING APPARATUS, METHOD OF CONTROLLING THE SAME, AND STORAGE MEDIUM

BACKGROUND OF THE INVENTION

1. Field of the Invention

The present invention relates to an image processing apparatus, a method of controlling the same, and a computer readable storage medium.

2. Description of the Related Art

Some image reading apparatuses such as scanners, multi function peripherals (MFPs), or the like, have a capability to extract and read out only an image of the specifically designated area of a document. One method to specify the designated area is constituted by, reading the document first, displaying the read image on a console screen, and a user specifying a desired area while viewing the displayed image.

Also, when using an MFP, copier, or the like, a document such as a book, a magazine, or the like may be read in a spread-open state, and a content of the facing pages is copied. In such a case, a user puts the document in a spread-open state face-down on a reading unit of the MFP or the like, and presses a start button to take a copy. Accordingly, the MFP reads the facing pages in the same manner as a normal document, and prints an image based on the read image data.

Also, such a copier and an MFP may, for example, by a user's operation, be set to a two-page spread mode, in which two facing pages of a document can be divided into two pages. In the two-page spread mode, the two facing pages of the document are read, and the read image data can be processed by, for example, being divided into two parts of a predetermined size, or being divided into two parts according to the size of the read image data. (For example, refer to Japanese Patent Laid-Open No. 2006-186946).

There is a problem that the document may be divided in an area different from the user's intention, when being divided into the two parts of a predetermined size described above, in the case when the user misaligns the facing pages on the reading unit, or in the case when the two-page spread mode is set for a document having a size other than the predetermined size. Also, even in the apparatus described in the Japanese Patent Laid-Open No. 2006-186946, there is a case that the page size resulted from dividing the read facing pages into two is different from the page size resulted from dividing the actual facing pages into two, because pages other than the facing pages may be read when reading the facing pages of a thick document.

SUMMARY OF THE INVENTION

An aspect of the present invention is to eliminate the above-mentioned problems with the conventional technology.

A feature of the present invention is to provide a technique for eliminating a shift of an area of each of facing pages, by specifying the area of each of the facing pages being controlled in coordination with other pages.

According to an aspect of the present invention, there is provided an image processing apparatus, comprising: a preview display unit configured to display a preview image based on image data read in a two-page spread mode in which facing pages of a document are read and divided into two pages; a specifying unit configured to specify a first area of one of the divided pages in the two-page spread mode on the preview image displayed by the preview display unit; an area setup unit configured to reflect the first area specified by the specifying unit on a second area to be specified of the divided other page in the two-page spread mode; and an extracting unit configured to extract image data of the first and the second areas from the image data read in the two-page spread mode.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A and 5B are flowcharts for describing processing of the image reading apparatus when copying is instructed in a two-page spread mode, in the image reading apparatus according to a first embodiment.

FIGS. 9A-9B are diagrams illustrating an example of a document read in the first embodiment.

FIG. 9C is a diagram illustrating an example of a document read in a second embodiment, in a case where the shape of either side is not symmetrical.

FIGS. 11A and 11B are flowcharts for describing an operation of the image reading apparatus when a copy is instructed in a two-page spread mode, in the image reading apparatus according to the second embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Although an explanation of an image processing apparatus according to the present invention is described, in the following embodiments, for an image reading apparatus such as a multi-function peripheral (MFP) and the like as an example, the present invention is not limited to this, and is also applicable to PCs which can print by inputting a document image.

Figure 1:
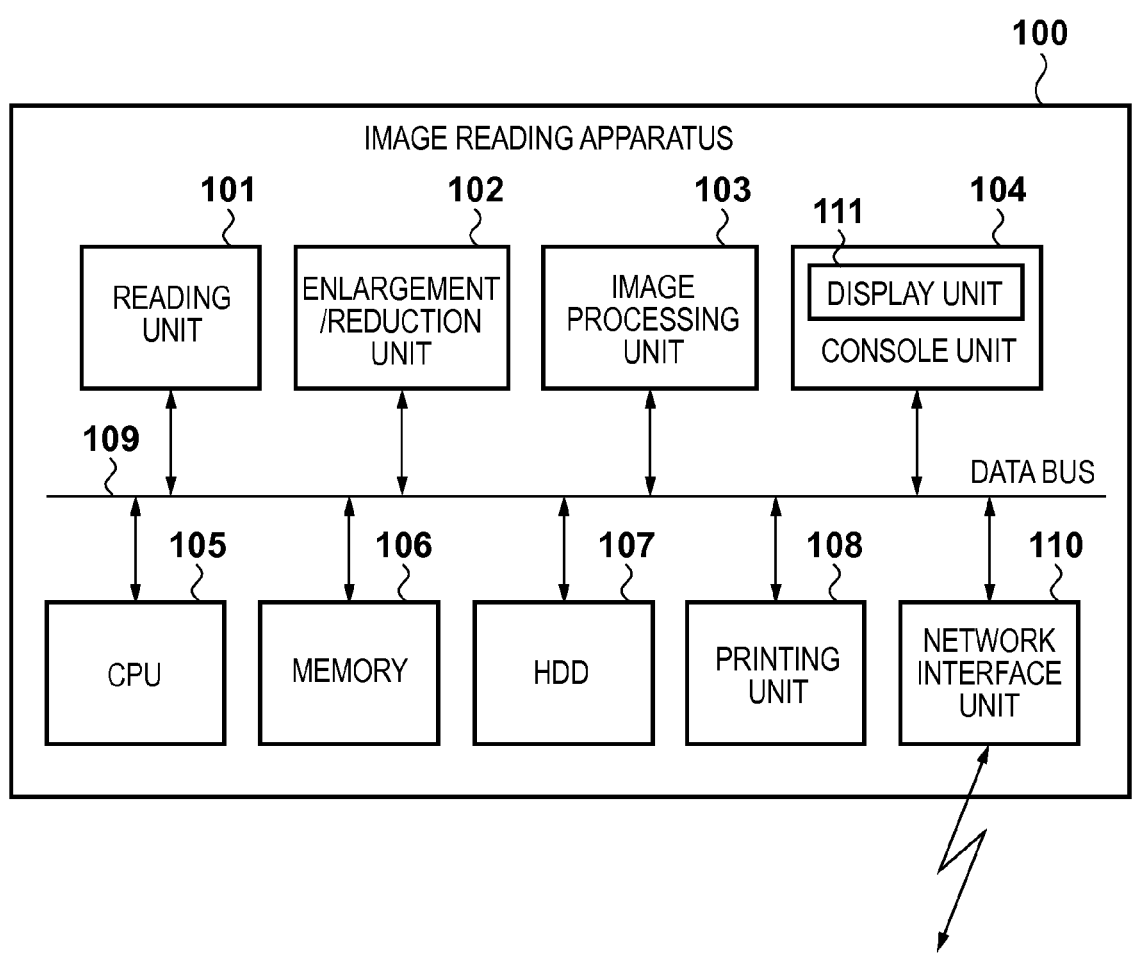
FIG. 1 is a block diagram illustrating a configuration of an image reading apparatus according to an embodiment.

FIG. 1 is a block diagram illustrating a configuration of an image reading apparatus 100 according to the first embodiment.

A reading unit 101, whose function is controlled by a CPU 105, generates image data by reading a document set by a user on a platen (not shown), and stores the image data in a memory 106 through a data bus 109. An enlargement/reduction unit 102, the function of which is controlled by the CPU 105, receives the image data stored in the memory 106 through the data bus 109, performs an enlargement/reduction process of an image, and stores the resultant image data in the memory 106 through the data bus 109. An image processing unit 103, the function of which is controlled by the CPU 105, receives the image data stored in the memory 106 through the data bus 109, and stores resultant processed image data in the memory 106 through the data bus 109. Also, the image processing unit 103 can generate image data by extracting any area of the image data which is output from the reading unit 101. A console unit 104 has a display unit 111 with a touch panel. The console unit 104, the function of which is controlled by the CPU 105, displays information received from the CPU 105 through the data bus 109 on the display unit 111 with the touch panel, and sends control information that a user inputs on the touch panel to the CPU 105.

The CPU 105 deploys a program stored in a HDD 107 on the memory 106, and controls the image reading apparatus 100 following the program. The memory 106 is used to store the program for the CPU 105, the image data, and the like. The HDD (hard disk drive) 107, in which the program for the CPU 105 is stored, is also used to store the image data and the like. Also, the HDD 107 stores information, in advance, relating to a form image used for image compositing. A printing unit 108, the function of which is controlled by the CPU 105, prints the image data received through the data bus 109 on a paper using an electrophotographic process, an ink jet method, or the like. A network interface unit 110, the function of which is controlled by the CPU 105, receives the image data and various information from the network, and sends the image data stored in the memory 106 and various information through the network. The data bus 109 transfers the image data and the information among the units described above connected through the data bus 109.

Figure 2A:
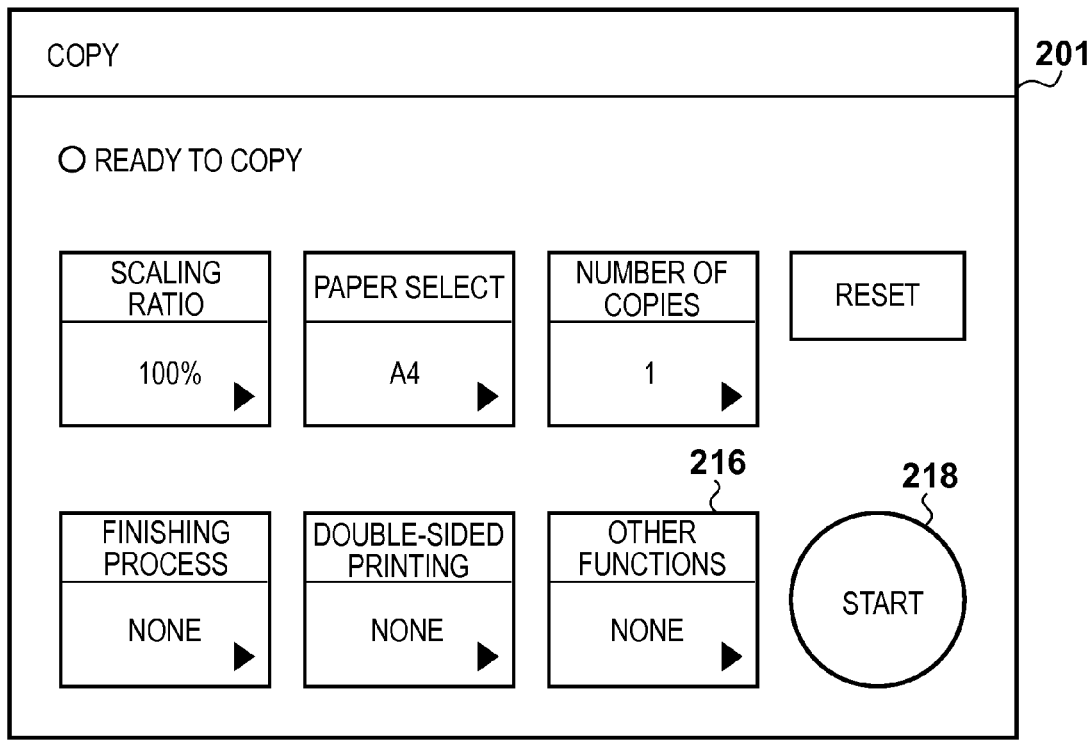
FIGS. 2A-2C are schematic diagrams illustrating a screen displayed on a display unit of a console unit in the image reading apparatus according to the embodiment.
Figure 2B:
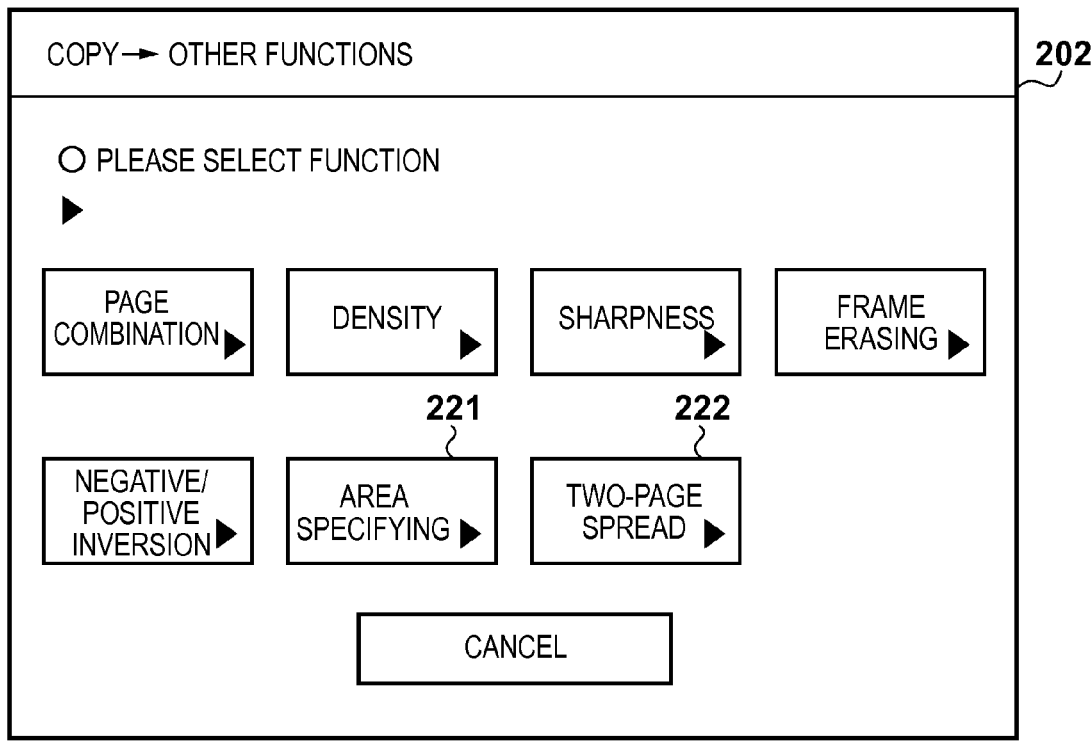
Figure 2C:
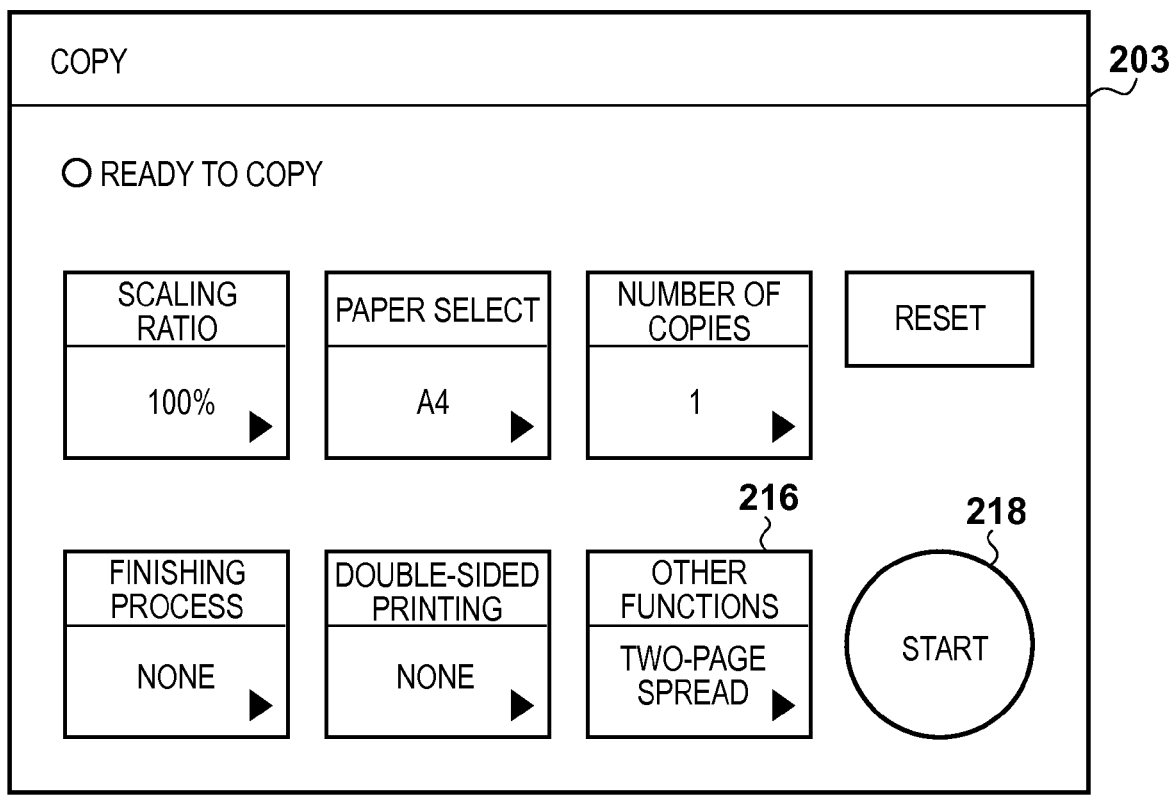

FIGS. 2A-2C are schematic diagrams illustrating a screen displayed on the display unit 111 of the console unit 104 in the image reading apparatus 100 according to the first embodiment.

FIG. 2A depicts a view illustrating an example of a standby screen 201 in a copy function. FIG. 2B depicts a view illustrating an example of a setup screen 202 in the other functions of the copy function. FIG. 2C depicts a view illustrating an example of a standby screen 203 of the copy function in which a two-page spread mode is being set in the copy function.

As described above, controlled by the CPU 105, detection of a user's operation and a switching of the display on the console unit 104 are performed. In the following, transitions of the display by the user's operation will be described. An initial state is the state of the standby screen 201 in FIG. 2A. In this state, when an other-functions button 216 is pressed, it changes to the state of the setup screen 202 in FIG. 2B. When a two-page spread button 222 is pressed in this state, it changes to the standby screen 203 in FIG. 2C where "two-page spread" is displayed on the other function button 216.

Also, when an area specifying button 221 is pressed in the state in FIG. 2B, "area specifying" is displayed on the other functions button 216 in the setup screen in FIG. 2C.

In addition, in the standby screen 201 in FIG. 2A, a setup of scaling ratio, paper selection, a setup for a number of copies, a setup for a finishing process such as stapling or the like, a setup for double-sided printing, and the like are able to be performed. Also, in the other functions setup screen 202 in FIG. 2B, a page combination such as 2 in 1, density, sharpness, frame erasing, negative positive reversal, specifying an area, a two-page spread, or the like can be specified.

Figure 3:
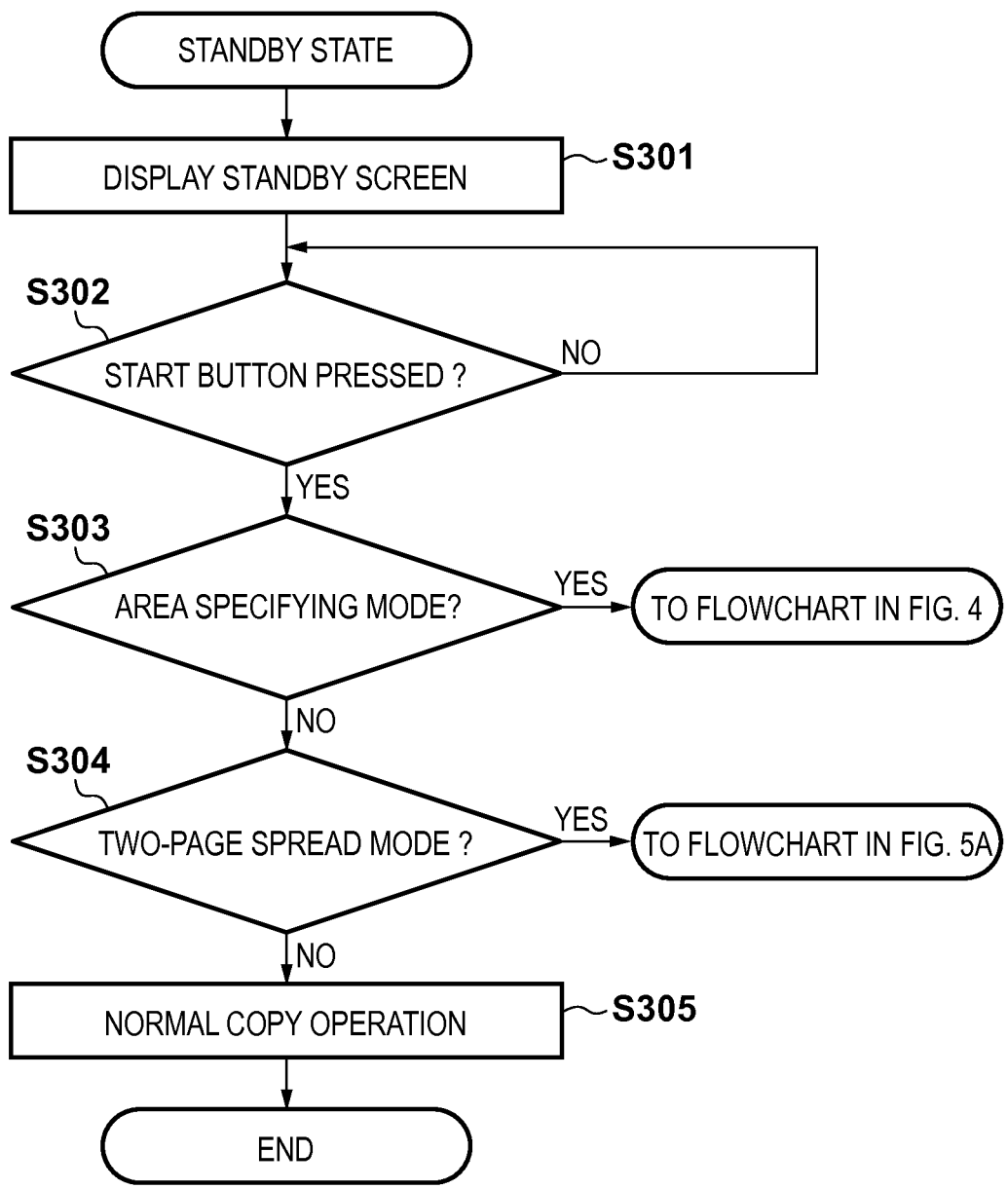
FIG. 3 is a flowchart for describing a process when the image reading apparatus according to the embodiment is displaying a standby screen of a copy function shown in FIG. 2A or 2C.

FIG. 3 is a flowchart for describing a process when the image reading apparatus 100 according to the first embodiment is displaying the standby screen 201 or 203 of the copy function shown in FIG. 2A or 2C. Here, for the sake of simplifying the explanation, details of the process for setting up the area specifying mode and the two-page spread mode is omitted. This process is performed by the CPU 105 which executes the program expanded in the memory 106.

First, in step S301, the CPU 105 displays, on the console unit 104, the standby screen 201 or 203 of the copy function shown in FIG. 2A or 2C, and the process proceeds to step S302. Although FIG. 2C illustrates an occasion when the two-page spread is set using the screen shown in FIG. 2B, the area specifying mode can also be set. In step S302, the CPU 105 determines, at the console unit 104, whether or not a start button 218 on the standby screen shown in FIG. 2A or 2C is pressed. The process proceeds to step S303 if the start button 218 is pressed, and stays in step S302 if not.

In step S303, the CPU 105 determines whether or not the area specifying mode is set. The process proceeds to a flowchart for processing the area specifying mode shown in FIG. 4 if the area specifying mode is set, or proceeds to step S304 if not. In step S304, the CPU 105 determines whether or not the two-page spread mode is set. The process proceeds to a flowchart for processing the two-page spread mode shown in FIGS. 5A and 5B if the two-page spread mode is set, or proceeds to step S305 if not. Here, the two-page spread mode is to read two facing pages of a document, and to divide the two facing pages into respective pages. For example, when the start button 218 is pressed in the state shown in FIG. 2C, the process proceeds to the process for the two-page spread mode shown in FIGS. 5A and 5B. In step S305, the CPU 105 performs a normal copy process rather than the area specifying mode or the two-page spread mode. This state corresponds to, for example, the state when the start button 218 is pressed in the state shown in FIG. 2A. The detailed operation in the step S305 is omitted for the sake of simplifying the explanation.

Figure 4:
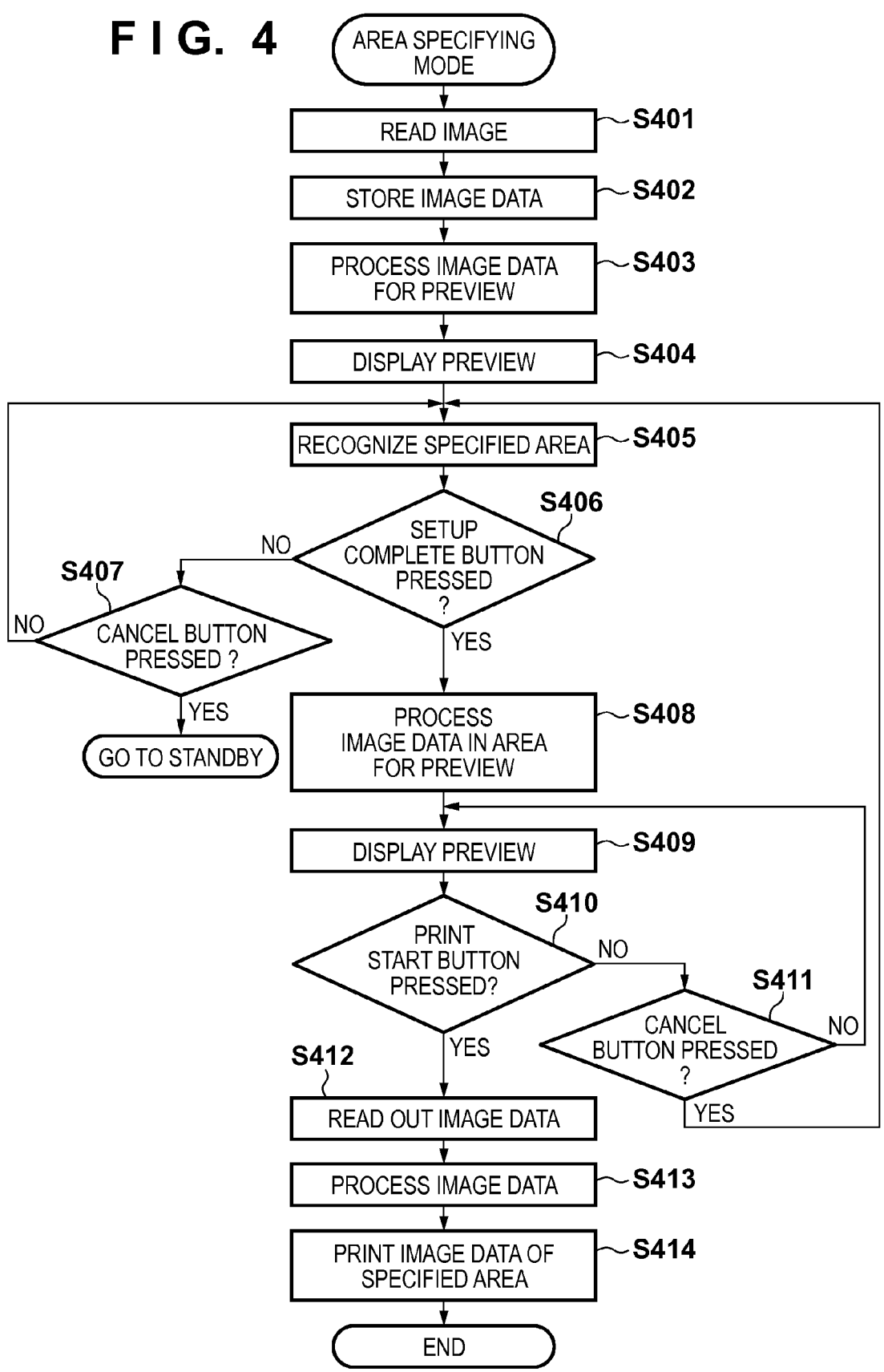
FIG. 4 is a flowchart for describing processing of the image reading apparatus when a start button is pressed in an area specifying mode.

FIG. 4 is a flowchart for describing processing of the image reading apparatus 100 according to the first embodiment when the start button 218 is pressed in the area specifying mode. This process is performed by the CPU 105 which executes the program deployed in the memory 106. This corresponds to the occasion when the start button 218 is pressed, in the state of the "area specifying" displayed in the other-functions button 216, in the setup screen shown in FIG. 2C.

Figure 6A:
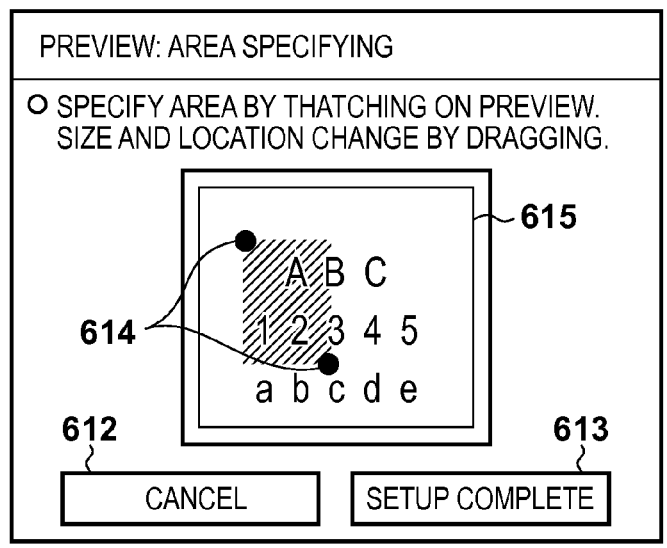
FIGS. 6A-6C are schematic diagrams illustrating a screen displayed on a console unit when the image reading apparatus according to the embodiment executes a process in an area specifying mode.
Figure 6B:
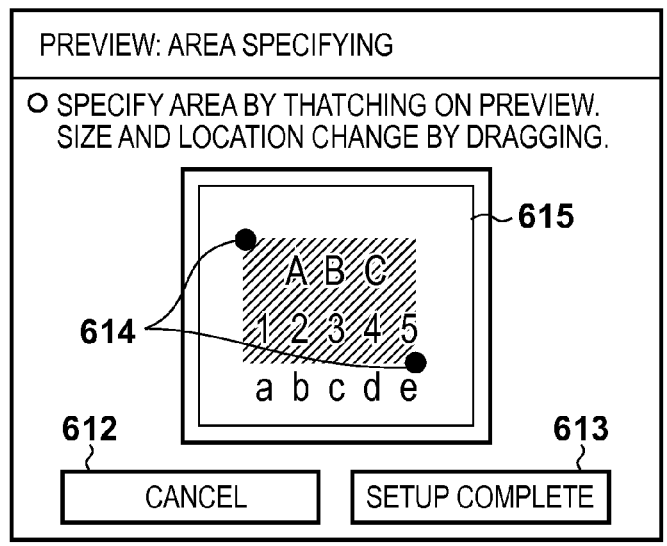
Figure 6C:
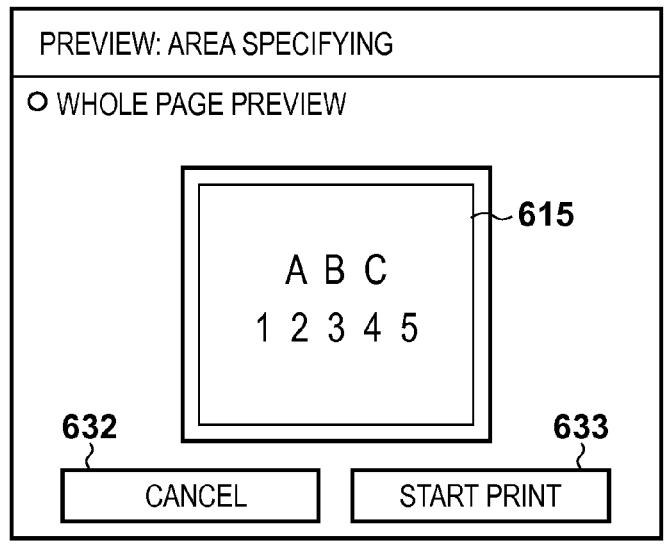

FIGS. 6A-6C are schematic diagrams illustrating a screen displayed on the console unit 104 when the image reading apparatus 100 according to the first embodiment executes a process in the area specifying mode.

In step S401, the CPU 105, in response to the pressing of the start button 218, reads the whole document by the reading unit 101. Then proceeding to step S402, the CPU 105 stores image data obtained by reading in the memory 106 and the HDD 107, and the process proceeds to step S403. In step S403, the CPU 105 transfers the image data stored in the memory 106 to the image processing unit 103 for processing the image data for a preview. The CPU 105 also transfers the image data to the enlargement/reduction unit 102 for performing enlargement/reduction process for the preview. Then proceeding to step S404, the CPU 105 displays a preview image on the display unit 111 of the console unit 104, according to the image data processed for the preview.

Next, proceeding to step S405, the CPU 105 recognizes the area specified by the user, by receiving the area specifying operation by the user performed on the preview image displayed on the console unit 104.

In the following, transition of the display on the console unit 104 by the user's operation in step S406 will be described, with reference to FIGS. 6A and 6B.

FIG. 6A is a diagram illustrating an example of the area specifying setup screen displaying a preview image 615 of a document. In this state, the preview image of the document and a hatched area superimposed thereon are displayed, and the user can change the setup of the size and the location of the hatched area by dragging buttons 614 displayed at the corners of the hatched area. A screen after enlarging the hatched area by dragging the buttons 614 from the state shown in FIG. 6A is the area specifying setup screen shown in FIG. 6B.

Next, proceeding to step S406, the CPU 105 determines whether or not a setup complete button 613 shown in FIGS. 6A and 6B is pressed. The process proceeds to step S407 if the button is not pressed, or proceeds to step S408 if the button is pressed and completes the area specifying setup. In the step S407, the CPU 105 determines whether or not a cancel button 612 is pressed. The process returns to step S405 if the button is not pressed, and again recognizes the specified area. If the cancel button 612 is pressed, the process returns to the flow chart in the standby state.

In step S408, the CPU 105 transfers the image data stored in the memory 106 to the image processing unit 103, where image processing such as extracting of the image data corresponding to the hatched area, centering, or the like is performed, and stores the resultant processed image data in the memory 106. Proceeding to step S409, the CPU 105 displays a preview image of the area specified by the hatched area based on the processed image data that is stored in the memory 106 in step S408, on the console unit 104.

FIG. 6C is a diagram illustrating a display example of a preview image of the area after the user has completed specifying the extracting area of the image shown in FIG. 6B. Here, the area specified by the hatched area in FIG. 6B is displayed as a preview image 615.

Next, proceeding to step S410, the CPU 105 determines whether or not a print start button 633 is pressed, on the screen in FIG. 6C, and the process proceeds to step S411 if not pressed, or proceeds to step S412 if pressed. In step S411, the CPU 105 determines whether or not a cancel button 632 is pressed, on the screen in FIG. 6C, and the process returns to step S409 if not pressed, and continues to display the preview image 615. On the other hand, if the cancel button 632 is pressed in step S411, the process returns again to step S405 to specify the area by the hatched area in FIG. 6A or 6B.

If the print start button 632 is pressed in step S410, the process proceeds to step S412, and the CPU 105 reads the image data stored in the HDD 107 in step S402 and stored it in the memory 106. Next, proceeding to step S413, the CPU 105 transfers the image data stored in the memory 106 in step S412 to the image processing unit 103, and extracts the image data corresponding to the hatched area specified in the area specifying setup screen in FIG. 6B, and stores it in the memory 106. Next, in step S414, the CPU 105 reads the image data corresponding to the hatched area stored in the memory 106 in step S413, and transfers it to the print unit 108 for printing.

Thus, printing of an image corresponding to the image data of the extracted area is made possible by displaying image data obtained by reading a document, and specifying an extracting area of the image data on the screen.

Next, an operation of a two-page spread mode according to the first embodiment will be described for a copy operation for a document shown in FIGS. 9A and 9B as an example, with reference to flowchart shown in FIGS. 5A and 5B.

A document shown in FIGS. 9A and 9B is assumed to be read in the sequence of FIG. 9A and FIG. 9B continuously. Also, FIGS. 7A-7D and FIGS. 8A-8D are schematic diagrams of a display screen on the console unit 104 when an area of a page is specified in the two-page spread mode. As described above, controlled by the CPU 105, a user's operation detection and a display on the console unit 104 are performed.

Figure 5A:
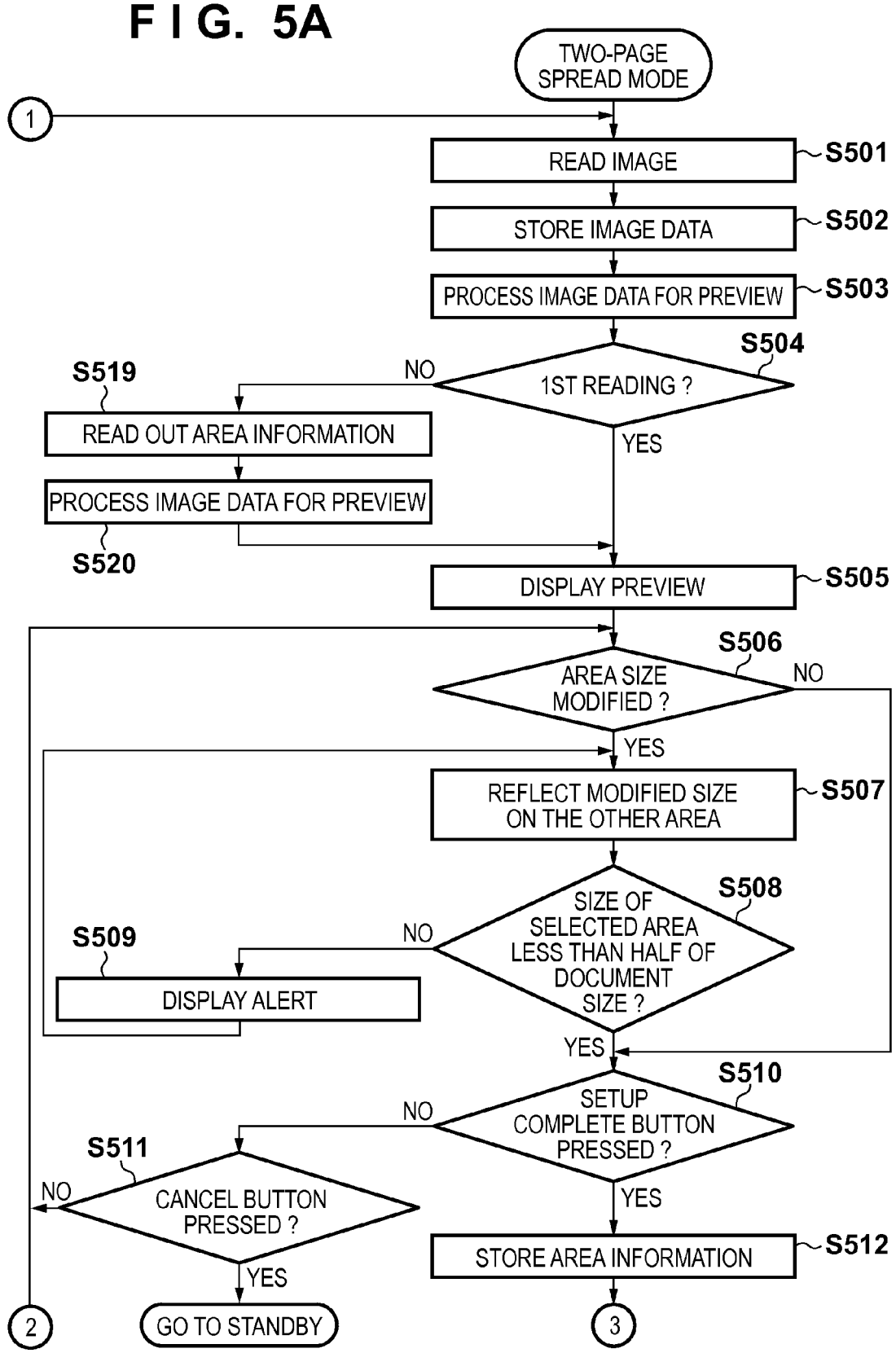

FIGS. 5A and 5B are flowcharts for describing processing of the image reading apparatus 100 when a copy is requested in the two-page spread mode, in the image reading apparatus 100 according to the first embodiment. The process is performed by the CPU 105 executing a program deployed in the memory 106.

First, in step S501, the CPU 105 reads a whole document shown in FIG. 9A by the reading unit 101. Then in step S502, image data obtained by the reading is stored in the memory 106 and the HDD 107, and the process proceeds to step S503. In step S503, the CPU 105 transfers the image data stored in the memory 106 to the image processing unit 103 for processing an image for a preview, and stores the resultant processed image data in the memory 106. The CPU 105 also transfers the image data to the enlargement/reduction unit 102 for performing an enlargement/reduction process for the preview, and stores the resultant image data for the preview in the memory 106.

Then proceeding to step S504, the CPU 105 determines if the image data read by the reading unit 101 is the first reading data, and the process proceeds to step S505 if it is the first reading data, or proceeds to step S519 if it is the second or subsequent reading. In step S505, the CPU 105 displays, on the console unit 104, the preview image of the reading image stored in the memory 106, and two hatched areas (716 and 717 in FIG. 7A) for the area specifying in the two-page spread mode superimposed thereon.

Figure 7A:
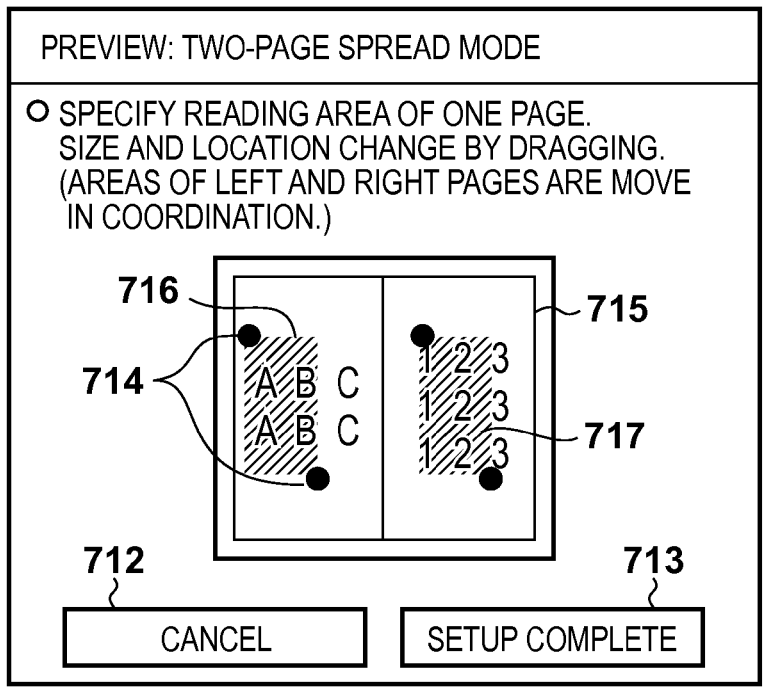
FIGS. 7A-7D are diagrams illustrating an example of a screen displayed on a console unit when specifying an area of a page in a two-page spread mode according to the first embodiment.

FIG. 7A depicts a view illustrating an area setup screen in the two-page spread mode displaying a preview image 715 of two facing pages of a document. A hatched area 716 shows an area in a left page (first area), a hatched area 717 shows an area in a right page (second area). The user can change the area specifying setup in the two-page spread mode by dragging a button 714 displayed at the corner of the hatched area.

Next, proceeding to step S506, the CPU 105, for the preview image 715 displayed on the console unit 104, determines if the area size is changed by receiving the operation to specify the area of one of the pages by the button 714. Here, the process proceeds to step S507 if the change of the size is instructed, or proceeds to step S510 if the change of the size is not instructed. In step S507, the CPU 105 reflects, with coordination between the two pages, the change of the area (first area) specified by the user on one of the two pages in step S506 on the other page (second area) to change the area of the other page.

Figure 7B:
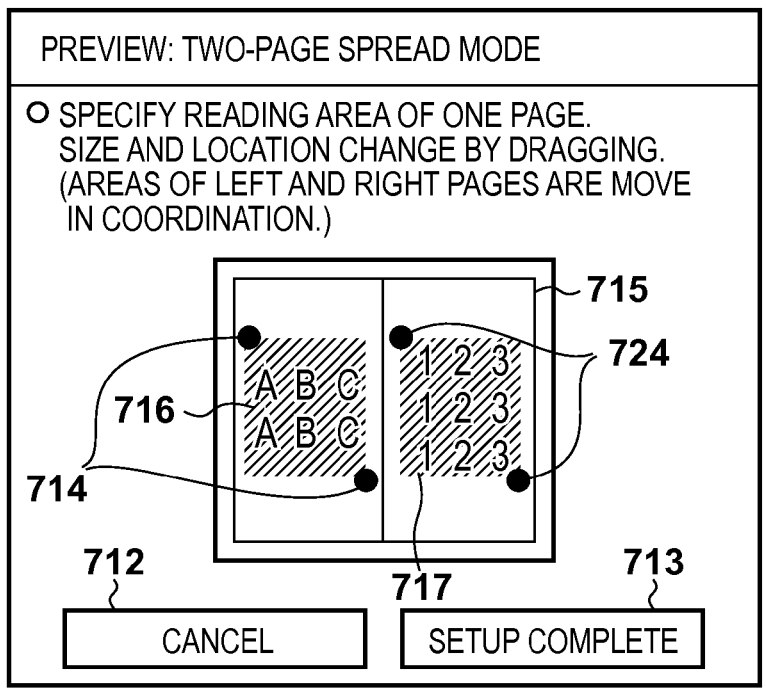

FIG. 7B depicts a view illustrating the two-page spread setup screen when the hatched area 716 on the left page is changed by moving the button 714 from the state shown in FIG. 7A. Here, the CPU 105 modifies the location and the size of the hatched area 716, according to the dragging operation of the button 714, by the user, on the hatched area 716 shown on the console unit 104. Along with this, the location and the size of the hatched area 717 on the right page are changed according to the change of the hatched area 716.

Figure 7C:
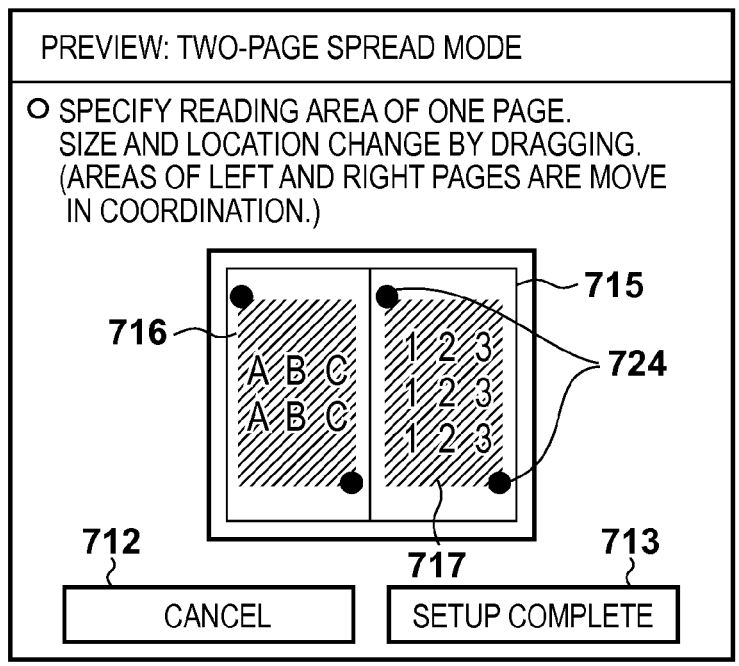

Also, the two-page spread mode setup display shown in FIG. 7C is the screen when the size of the hatched area 717 of the right page is changed from the state shown in FIG. 7B. Here, the CPU 105 modifies the hatched area 717 according to the drag operation of the button 724, upon detecting the change operation, by the user, of the hatched area 717 displayed on the console unit 104. In addition, the size of the hatched area 716 on the left page is changed according to the change of the hatched area 717 on the right page.

Next, proceeding to step S508, the CPU 105 determines if the hatched area displayed on the console unit 104 by the user's operation exceeds half the size of the document of facing pages, and the process proceeds to step S509 if it exceeds, and to step S510 if it does not exceed. In step S509, the CPU 105 displays an alert on the console unit 104, and prompts the user to modify the area in the two-page spread, and the process proceeds to step S507.

Figure 8A:
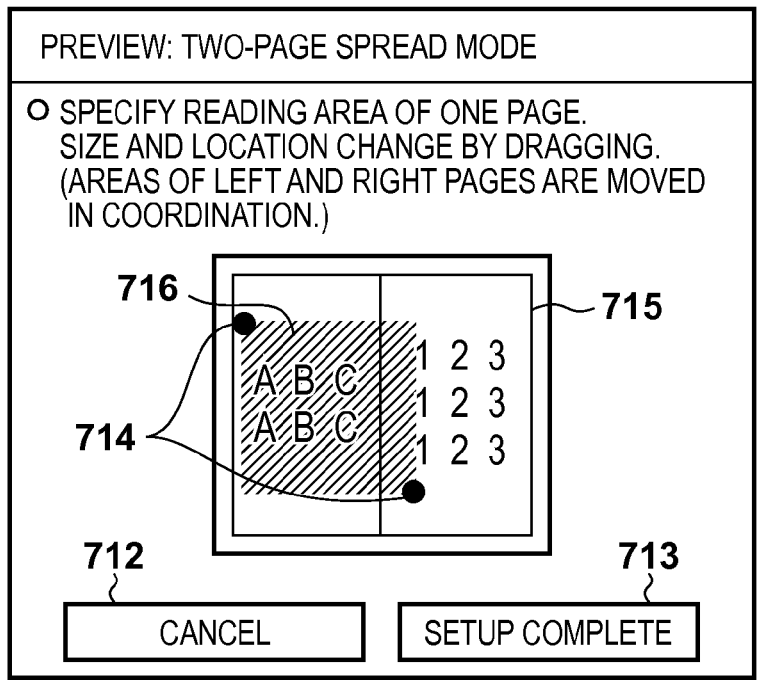
FIGS. 8A-8D are diagrams illustrating an example of a screen displayed on a console unit when specifying an area of a page in a two-page spread mode according to the first embodiment.

FIG. 8A depicts a view illustrating a two-page spread mode setup screen when the hatched area 716 exceeds half the size of two facing pages of the document by the user's modifying the size of the left page hatched area 716. In this diagram, the right page hatched area is omitted for simplifying the explanation.

Figure 8B:
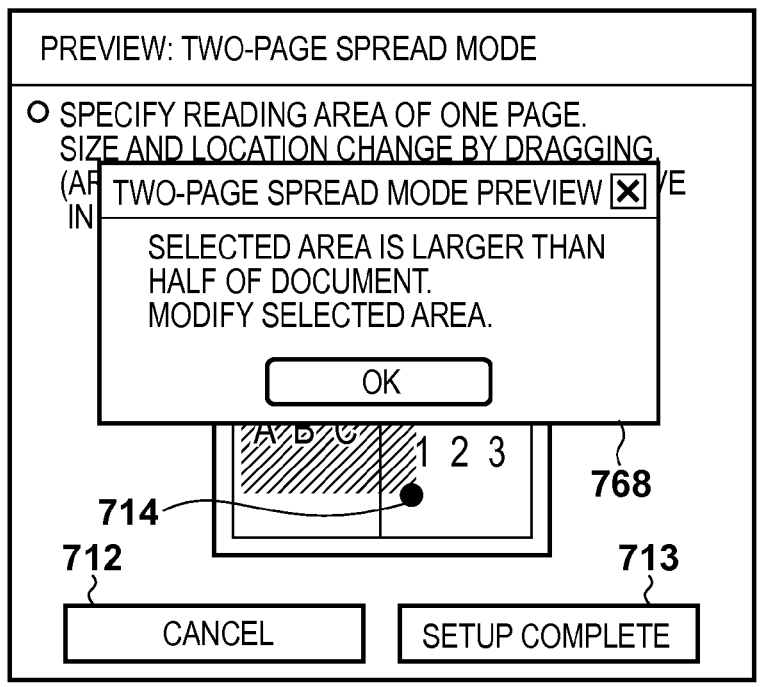

FIG. 8B depicts a view illustrating a two-page spread mode setup screen including an alert screen 768 displayed on the console unit 104 in step S509, when the specified area size in the two-page spread mode exceeds half the size of two facing pages of the document. In the first embodiment, it prompts the user to modify the area setup by displaying the alert screen. The CPU 105 may automatically modify the area size equal to or under half the size of two facing pages of the document.

The process proceeds to step S510 if the CPU 105 determines the hatched area does not exceed half the size of two facing pages of the document in step S508, and the CPU 105 determines whether or not a setup complete button 713 is pressed. The process proceeds to step S511 if the setup complete button 713 is not pressed, or proceeds to step S512 if the button 713 is pressed and completes the area specifying process in the two-page spread mode. In step S511, the CPU 105 determines whether or not a cancel button 712 is pressed. The process returns to step S506 if the cancel button 712 is not pressed, and again recognizes the area specifying. If the cancel button 712 is pressed, it returns to the standby state.

When the setup complete button 713 is pressed, the process proceeds to step S512, and the CPU 105 stores the area information (size and location) of the hatched area 716 and the hatched area 717 specified in the two-page spread mode setup screen in the memory 106. Next, proceeding to step S513 (FIG. 5B), the CPU 105 transfers the preview image data stored in the memory 106 to the image processing unit 103, and image processing such as extracting of image data, centering, or the like is performed based on the area information stored in step S512. And the resultant image data is stored in the memory 106. Then, proceeding to step S514, the CPU 105 displays a preview image for the two-page spread mode stored in the memory 106 on the console unit 104.

Figure 7D:
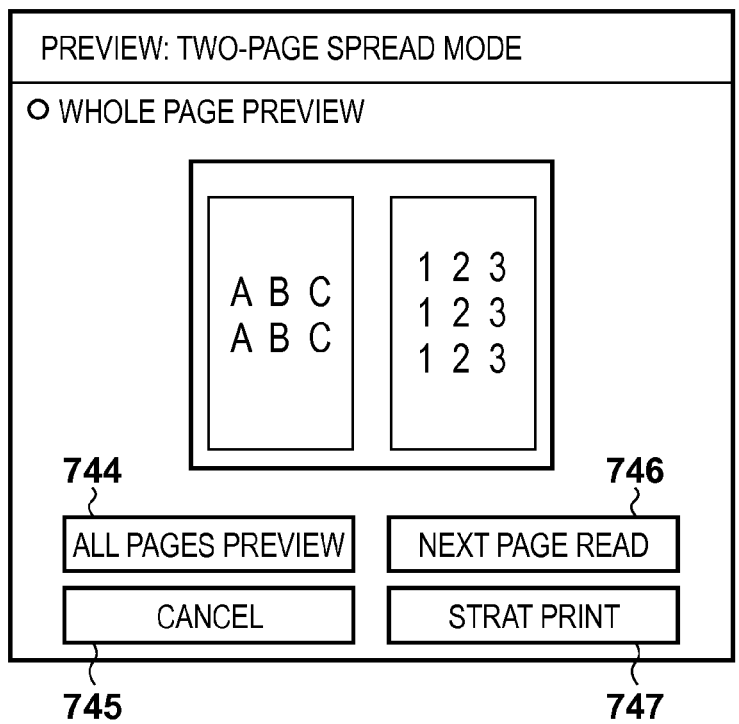

FIG. 7D depicts a view illustrating a whole preview screen after completing the area specifying in the two-page spread mode by the setup complete button 713 being pressed in FIG. 7C.

Next, proceeding to step S515, the CPU 105 determines whether or not an all pages preview button 744 shown in FIG. 7D is pressed, and the process proceeds to step S521 if the button 744 is pressed, or proceeds to step S516 if not pressed. In step S516, the CPU 105 determines whether or not a print start button 747 is pressed, and the process proceeds to step S526 and starts a printing process if the button 747 is pressed, or proceeds to step S517 if not pressed. In step S517, the CPU 105 determines whether or not a cancel button 745 is pressed, and the process proceeds to step S506 (FIG. 5A) if the button 745 is pressed, and returns to the screen shown in FIG. 7C, for example. If the cancel button 745 is not pressed, the process proceeds to step S518. In step S518, the CPU 105 determines whether or not a next page reading button 746 is pressed, and the process returns to step S501 if the button 746 is pressed, or proceeds to step S506 if not pressed.

Next, a process for a second or subsequent reading data will be described when the next page reading button 746 is pressed in step S518. In the first embodiment, a document shown in FIG. 9B is supposed to be read for the second time. The processes from step S501 to step S518 are the same as those for the first reading data, thus the explanation is omitted.

In this case, because it is determined not to be the first time reading in step S504, the process proceeds to step S519 and the CPU 105 reads out the area information stored in the memory 106 in step S512 described above. Proceeding to step S520, the CPU 105 decides the size and the location of the area on the left and right pages specified in the two-page spread mode, based on the area information read out from the memory 106. The CPU 105 transfers the image data stored in the memory 106 to the enlargement/reduction unit 102 for performing an enlargement/reduction process for the preview, and stores the resultant image data for the preview in the memory 106, and the process proceeds to step S505. In step S505, the CPU 105 displays a preview image of the read image stored in the memory 106, with the two hatched areas for the area specifying in the two-page spread mode decided in step S520 being superimposed thereon.

Figure 8C:
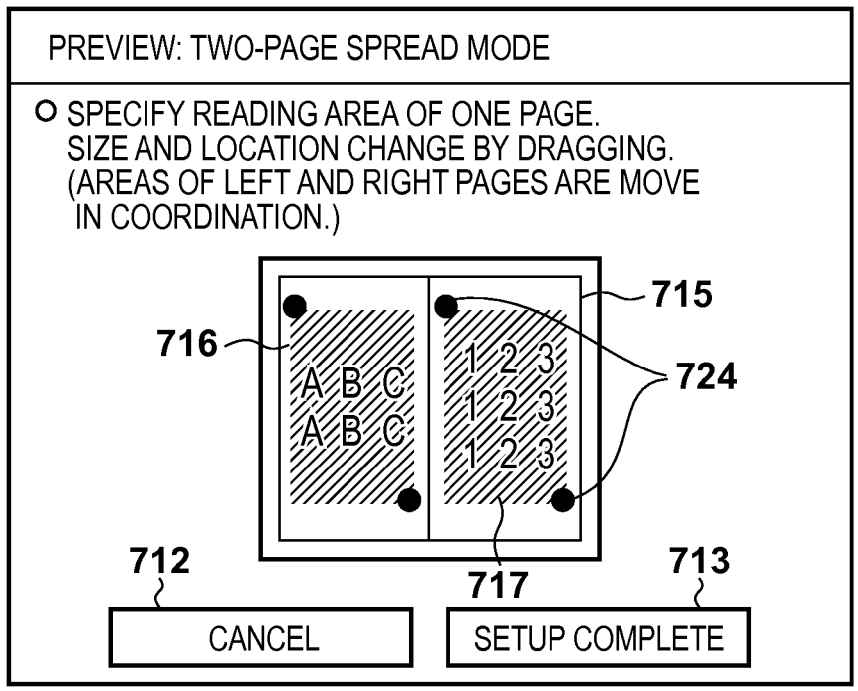

FIG. 8C depicts a view illustrating a two-page spread mode setup screen displaying an image preview 715 for two pages of a document of the second reading data. Here, since the location and the size of the area specified in the first reading is applied, the location and the size of the area specified by the user in FIG. 7C is applied.

Here, since the processes from step S506 to S517 are the same as those for the first reading data, the explanation is omitted.

Next, a preview operation from step S521 to step S525 for all pages will be described. This situation corresponds to, for example, the situation when the all pages preview button 744 is pressed in the state where a screen is displayed on the display unit 111 of the console unit 104, in which the content of the facing pages in FIG. 7D is changed to the facing pages of the document in FIG. 8C by the setup complete button 713 being pressed in FIG. 8C.

First, in step S521, the CPU 105 stores the image data of all the facing pages being read so far by this copy operation that is stored in the HDD 107 in the memory 106. Next, the CPU 105 transfers the image data stored in the memory 106 to the image processing unit 103, and image processing such as extracting of an image, centering, or the like is performed based on the area information stored in step S512. And the resultant image data is stored in the memory 106. Then, proceeding to step S522, the CPU 105 displays a preview image on the console unit 104 based on the preview image data for the two-page spread mode stored in the memory 106 in step S521.

Figure 8D:
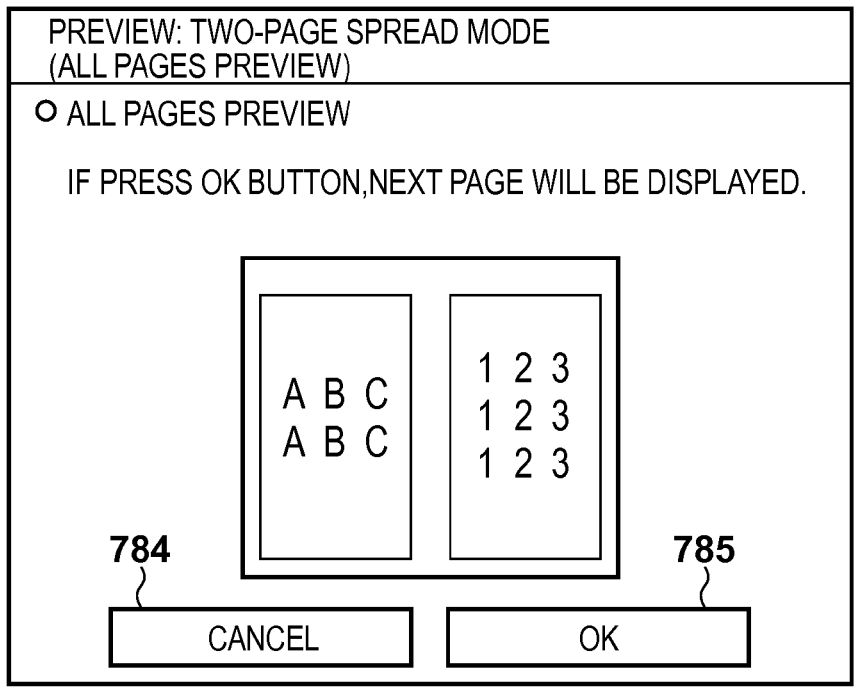

FIG. 8D depicts a view illustrating an exemplary display screen of the first two facing pages read in the all pages preview state. If an OK button 785 is pressed here, the two-page spread that is read next is displayed. In the previous example, the two-page spread shown in FIG. 9B is next displayed. In this way, if the area information for the page to be extracted is changed or set, the changed or set region information is applied to all the two-page spreads of the document being read so far, and the two-page spreads to be read later, and the applied result can be displayed for the preview.

In step S523, the CPU 105 determines whether or not a cancel button 784 is pressed in FIG. 8D, and if the button 784 is pressed, the all pages preview is cancelled and returns to the screen for example facing pages shown in FIG. 7D, and the process proceeds to step S516. The process proceeds to step S524 if the button 784 is not pressed. In step S524, the CPU 105 determines whether or not the OK button 785 is pressed in FIG. 8D, and the process proceeds to step S525 if the button 785 is pressed, or returns to step S523 if not pressed. In step S525, the CPU 105 determines whether or not the preview display for all the document that have been read is performed, and the process returns to step S521 if the preview display has not been completed for all the document being read, or proceeds to step S516 if the preview display has been completed for all the document being read.

Next, a print operation for the two-page spread mode in the copy processing will be described.

When a print start is instructed in step S516, the process proceeds to step S526, and the CPU 105 reads out the image data stored in the HDD 107 and stores it in the memory 106. Next, proceeding to step S527, the CPU 105 reads out the area information stored in the memory 106 in step S512 as described above. And, proceeding to step S528, the CPU 105 transfers the image data stored in the memory 106 to the image processing unit 103, and image processing such as extracting the image, centering, or the like, is performed based on the area information. And the result is stored in the memory 106. Proceeding to step S529, the CPU 105 reads out the processed image data stored in the memory 106 in step S528, and transfers it to the printing unit 108 for printing. Proceeding to step S530, the CPU 105 determines whether or not all the pages have been printed, and the process returns to step S526 if the printing for all the pages has not been completed, or proceeds to an end if all the pages have been printed.

By the operation described above, the process in the two-page spread mode in the copy operation has been completed.

In this manner, in the two-page spread mode, when a user specifies an area of the image to be extracted on a preview screen, change of the area of one of the two pages is reflected on the other page, and the area of the image to be extracted is changed accordingly. Thus, it becomes unnecessary for the user to adjust the reading area of each page independently, and it becomes possible for the user to specify the desired extracting area of the image easily.

Also, in the first embodiment, although the process for the two-page spread mode is described for a copy operation as an example, it is not limited to the copy operation, and applicable to the case when extracted image data of an image being read is transmitted through a network.

Second Embodiment

In the first embodiment, the operation is described for a symmetric document of facing pages in which area sizes of the left and the right pages are symmetric with respect to the center of the document, as an example. In a second embodiment, in contrast, an area setup in the two-page spread mode for a document having asymmetric sizes of the left and the right pages with respect to the center will be described.

FIG. 9C is a diagram illustrating an example of facing pages of a document to be read in the second embodiment, in which area sizes of the left and right pages are not symmetric with respect to the center, that is facing pages of a document not folded in the center.

Figure 10A:
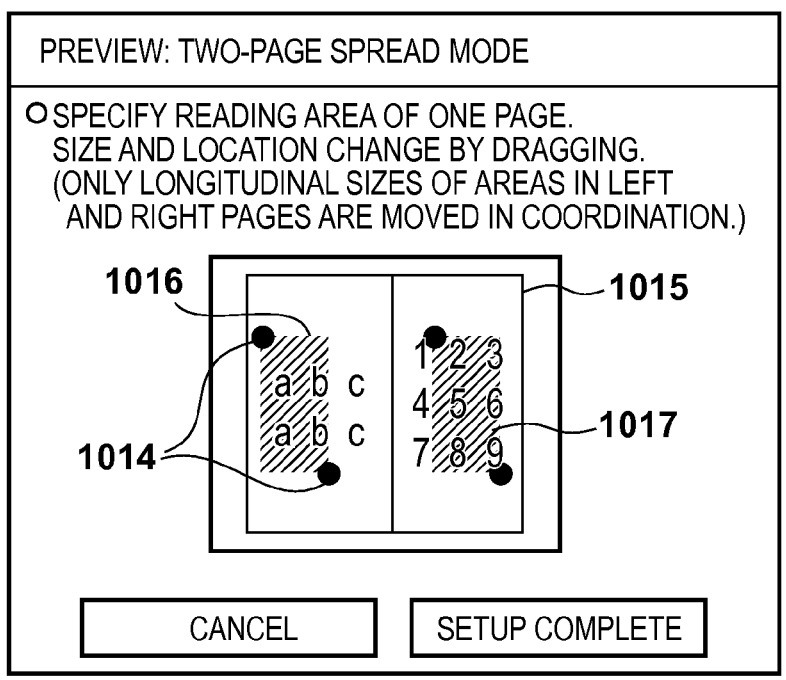
FIGS. 10A-10C are diagrams illustrating an example of a screen displayed on a console unit when specifying an area of a page in a two-page spread mode according to the second embodiment.
Figure 10B:
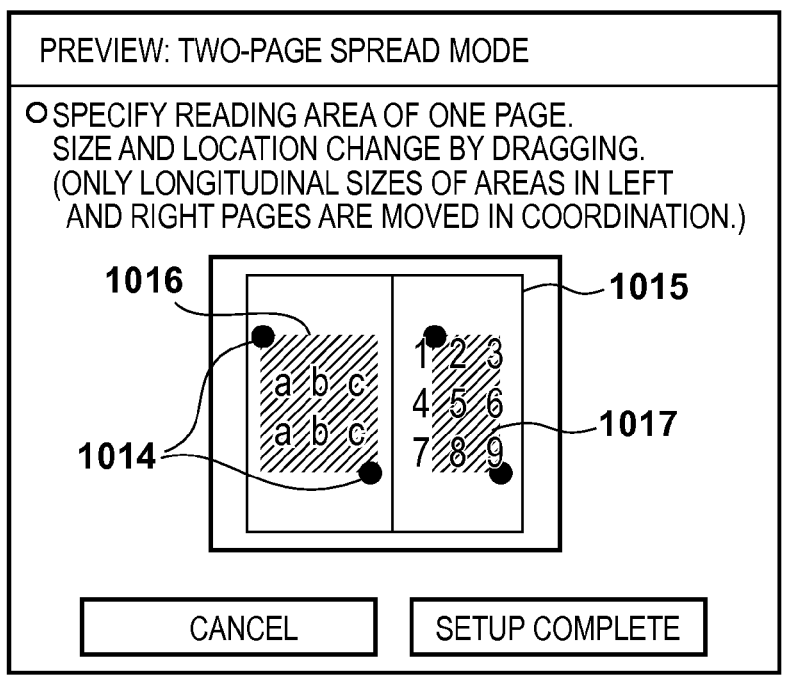
Figure 10C:
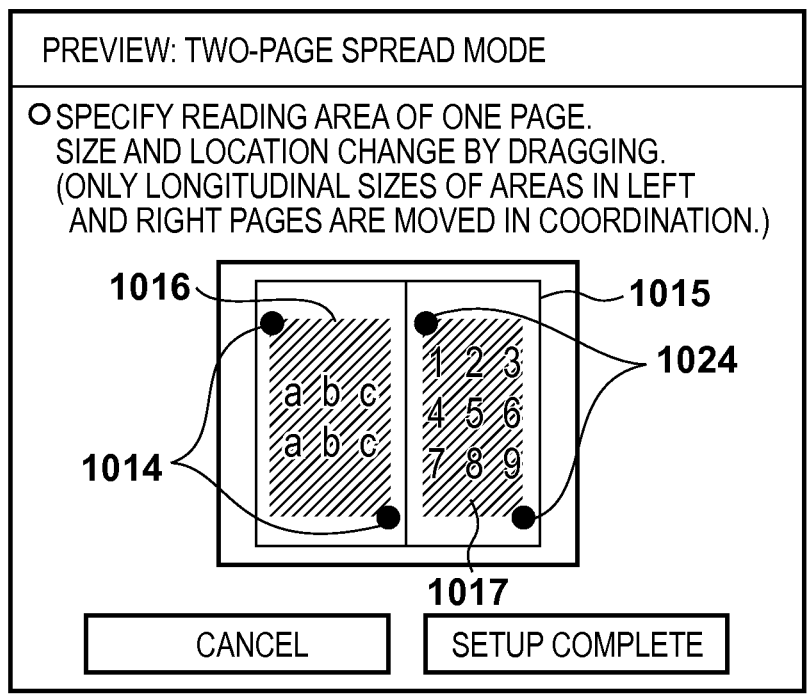

FIGS. 10A-10C depict views illustrating an example of a screen displayed on the console unit 104 when specifying areas of facing pages in the two-page spread mode according to the second embodiment.

Figure 11A:
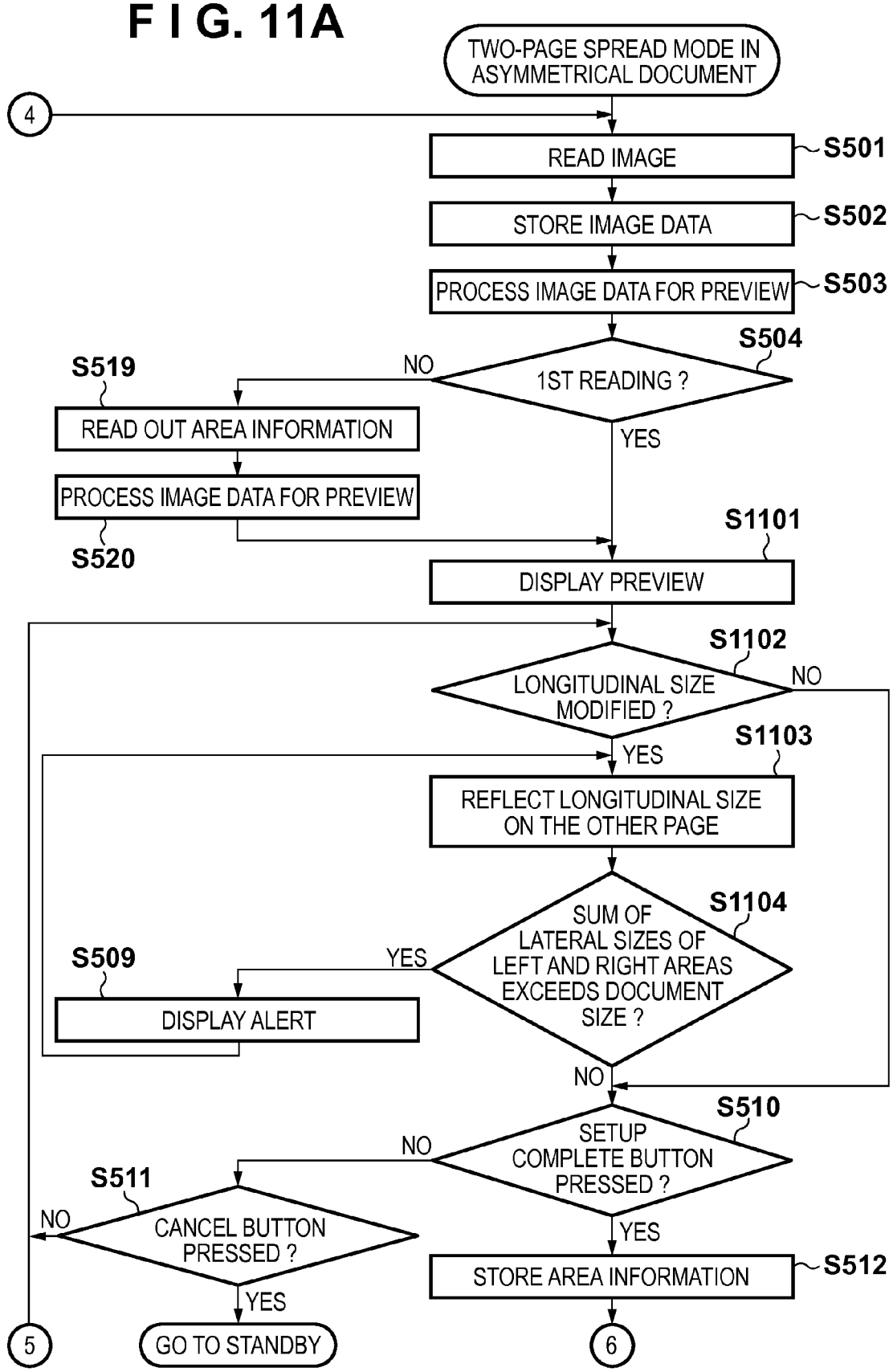

FIGS. 11A and 11B are, in an image reading out apparatus according to the second embodiment, flowcharts for describing processing of the image reading apparatus when a copy is instructed in the two-page spread mode. Here, since the configuration of the image reading apparatus according to the second embodiment is the same as that of the first embodiment described above, a detailed explanation will be omitted. Also, in the second embodiment, in a setup screen not being shown, the two-page spread mode for an asymmetric document which isn't folded in the center is assumed to be selected.

The processing of the second embodiment will be described as follows, with reference to the flowchart in FIGS. 11A and 11B.

In the flow chart in FIGS. 11A and 11B, since all the processes except for the steps from step S1101 to step S1104 are the same as the processes described in the flowchart in FIGS. 5A and 5B for the first embodiment, the explanation is omitted by using the same symbols, and the steps only from step S1101 to step S1104 will be described for the second embodiment.

In step S1101, the CPU 105 displays a preview image based on the preview image data of the read image stored in the memory 106, along with two hatched areas for specifying an area in the two-page spread mode superimposed thereon.

FIG. 10A depicts a view illustrating a two-page spread mode setup screen displaying a preview image 1015 of a document image, and a hatched area 1016 shows an area on the left page, and a hatched area 1017 shows an area on the right page. A user can change the setup for extracting an area in the two-page spread mode by dragging a button 1014 displayed at the corners of the hatched areas 1016 and 1017.

In step S1102, the CPU 105 determines whether or not the longitudinal size is changed by receiving an area specifying operation on the left page by the button 1014 performed on the preview image displayed on the console unit 104. The process proceeds to step S1103 if the longitudinal size is changed, or to step S510 if the longitudinal size is not changed.

In step S1103, the CPU 105 reflects, with coordination between pages, only the change of the longitudinal size on the area in the right page among the area size change of the left page performed by the user in step S1102.

FIG. 10B depicts a view illustrating the two-page spread mode setup screen when the size of the hatched area 1016 of the left page is changed from the state shown in FIG. 10A. The CPU 105, upon detecting the change operation by the user for the hatched area 1016 displayed on the console unit 104, modifies the size of the hatched area 1016 according to the drag operation by the user. In the state shown in FIG. 10B, since only the lateral length of the hatched area 1016 is changed, the size of the hatched area 1017 on the right page is, differing from the first embodiment, not changed in coordination.

Also, a screen resulting from the size of the hatched area 1017 in the right page being changed from the state shown in FIG. 10B is the two-page spread mode setup screen shown in FIG. 10C. Here, the CPU 105, upon detecting the size change of the hatched area 1017 by the user displayed on the console unit 104, modifies the size of the hatched area 1017 according to the drag operation of the button 1024 by the user. At the same time, only the longitudinal size of the hatched area 1016 on the left page is changed in coordination to the size change of the hatched area 1017.

Accordingly, when the lateral lengths of the documents in the left and right pages of are different, that is, the sizes of the facing pages are not symmetric with respect to the center, the lateral sizes of the left and right pages are changed separately, and the longitudinal size change can be reflected on each other. Therefore, even in the case when the sizes of the left and right pages of facing pages are not symmetric to the center, there is an effect that the user can easily specify the area of each page.

Next, in step S1104, the CPU 105 determines whether or not the sum of the lateral sizes of the hatched area of the left and right pages displayed on the console unit 104 exceeds, by the user's operation, the size of the document of facing pages. The process proceeds to step S509 and displays an alert if it exceeds the document size of facing pages, or to step S510 if not.

As described above, since the process after step S510 is the same as that of the first embodiment, an explanation will be omitted.

Thus, when specifying a reading area in the two-page spread mode for a document of facing pages not folded in the center, only the longitudinal size change of the image extracting area of one page is reflected on the longitudinal size of the image extracting area of the other page, in coordination. Thus, it has become possible for the user to specify easily the desired reading area.

As described above, according to the embodiment, since a user specifies the extracting area of a document image, while confirming a preview screen of a document of facing pages, unintended division is avoided even in a document with non-standard sizes.

Also, when a document of facing pages is divided into two pages, by controlling specifying the image extracting areas of the left and right pages of the facing pages in coordination with each other, a misalignment of the specified areas of the respective facing pages can be avoided. Also, since the user can easily recognize and modify the misalignment of the specified areas of the facing pages, the user can obtain an expected processing result.

Other Embodiments

In the above embodiment, in a preview in the two-page spread mode, area specifying of one page is always reflected on area specifying of the other page, in coordination. However, there is an occasion when a different size and shape of an area is desired to be specified for the respective two facing pages. In order to respond to such a request, a configuration may be set in which a user can select between the mode in which, as the above embodiment, area specifying of the left and right pages is coordinated, and the mode in which the area specifying is performed separately. Alternately, after the operation in the mode where the area specifying of the left and right pages is coordinated, in response to a predetermined icon being pressed or to a predetermined instruction, the specified areas of left and right may be set to be manipulable independently. More specifically, after specifying the areas for extracting images in coordination, the size and the shape of the area of only one of the two pages may be made modifiable.

Also, the first embodiment and the second embodiment may be combined.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium.

While the present invention has been described with reference to exemplary embodiments, it is to be understood that the invention is not limited to the disclosed exemplary embodiments. The scope of the following claims is to be accorded the broadest interpretation so as to encompass all such changes and equivalent structures and functions.

This application claims the benefit of Japanese Patent Application No. 2012-132367, filed Jun. 11, 2012, which is hereby incorporated by reference herein in its entirety.

What is claimed is:

1. An image processing apparatus, comprising:
   a preview display unit configured to display a preview image based on image data read in a two-page spread mode in which facing pages of a document are read and divided into two pages;
   a specifying unit configured to specify a first area of one of the divided pages in the two-page spread mode on the preview image displayed by the preview display unit;
   an area setup unit configured to set a second area of the divided other page in the two-page spread mode based on area information of the first area, wherein the size and the location of the second area correspond to the size and the location of the first area; and
   an extracting unit configured to extract image data of the first and second areas from the image data read in the two-page spread mode.

2. The image processing apparatus according to claim 1, further comprising an image reading unit configured to read a document,
   wherein the image data read in the two-page spread mode is obtained by reading the document by the image reading unit.

3. The image processing apparatus according to claim 1, further comprising a display unit configured to display an image based on the image data extracted by the extracting unit.

4. The image processing apparatus according to claim 1, further comprising an all pages preview unit configured to apply the area information of the first area specified by the specifying unit and area information of the second area set by the area setup unit to image data read so far and display a preview image of each page of the image data.

5. The image processing apparatus according to claim 1, further comprising a designation unit configured to designate the second area of the divided other page in the two-page spread mode on the preview image displayed by the preview display unit.

6. The image processing apparatus according to claim 1, further comprising a printing unit configured to print an image based on the image data extracted by the extracting unit.

7. The image processing apparatus according to claim 1, wherein if the size of the image read in the two-page spread mode is symmetric with respect to the center of the two facing pages, the area setup unit sets the longitudinal and lateral sizes of the first area to the longitudinal and the lateral sizes of the second area.

8. The image processing apparatus according to claim 1, wherein if the size of the image read in the two-page spread mode is asymmetric with respect to the center of the two facing pages, the area setup unit sets the longitudinal size of the first area to the longitudinal size of the second area.

9. A control method of an image processing apparatus, comprising:
   displaying a preview image based on image data read in a two-page spread mode in which facing pages of a document are read and divided into two pages;
   specifying a first area of one of the divided pages in the two-page spread mode on the displayed preview image;
   setting a second area of the divided other page in the two-page spread mode based on area information of the first area, wherein the size and the location of the second area correspond to the size and the location of the first area; and,
   extracting image data of the first and second areas from the image data read in the two-page spread mode.

10. A non-transitory computer readable storage medium storing a program for causing a computer to function as an image processing apparatus comprising:
   a preview display unit configured to display a preview image based on image data read in a two-page spread mode in which facing pages of a document are read and divided into two pages;
   a specifying unit configured to specify a first area of one of the divided pages in the two-page spread mode on the preview image displayed by the preview display unit;
   an area setup unit configured to set a second area of the divided other page in the two-page spread mode based on area information of the first area, wherein the size and the location of the second area correspond to the size and the location of the first area; and
   an extracting unit configured to extract image data of the first and second areas from the image data read in the two-page spread mode.

* * * * *